May 1, 1956  F. P. MARTIN  2,743,567
MULTIPLE UNIT CONTOUR MOWER
Filed July 19, 1954  3 Sheets-Sheet 1
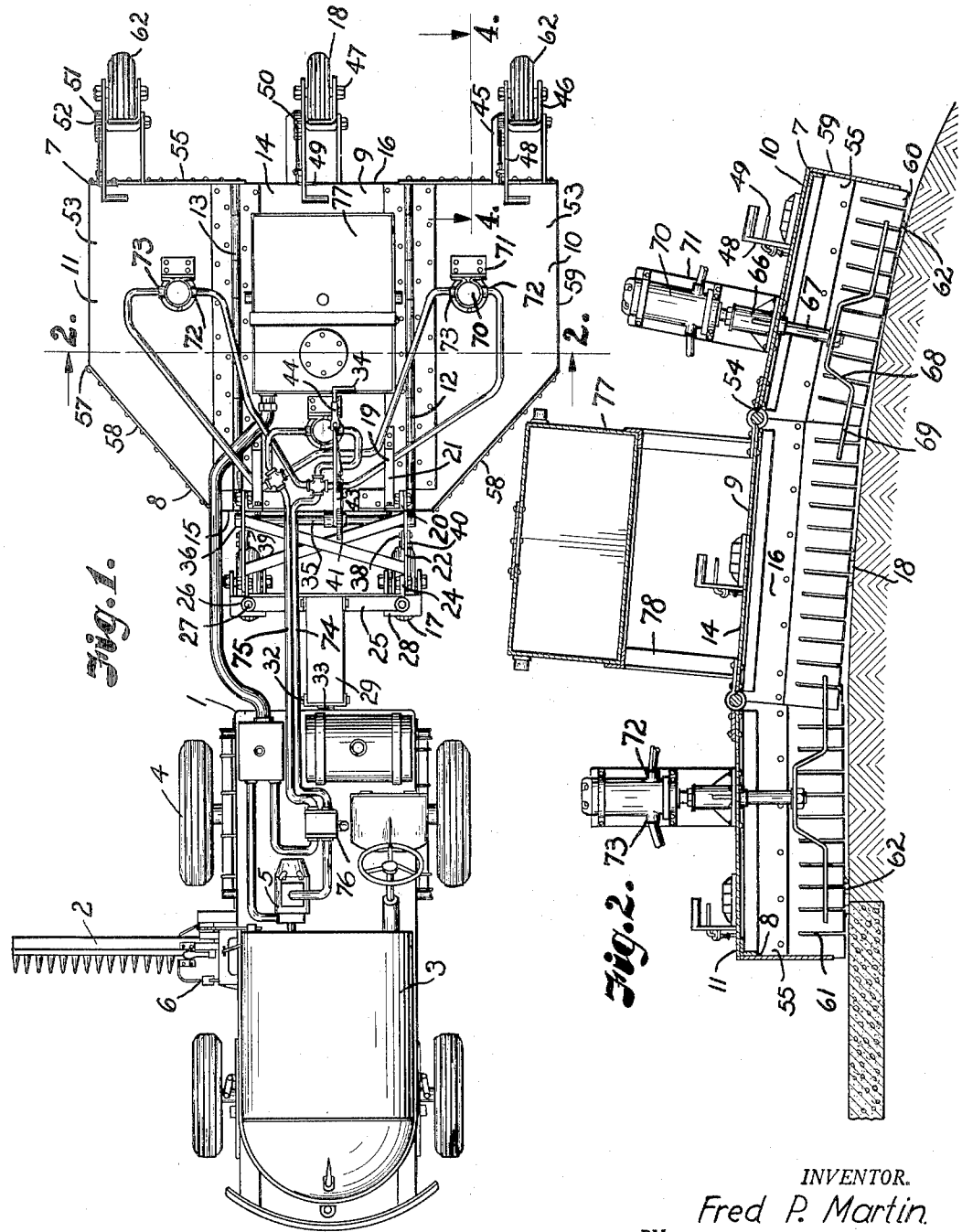
INVENTOR.
Fred P. Martin.
BY
Fishburn & Mullendore
ATTORNEYS.

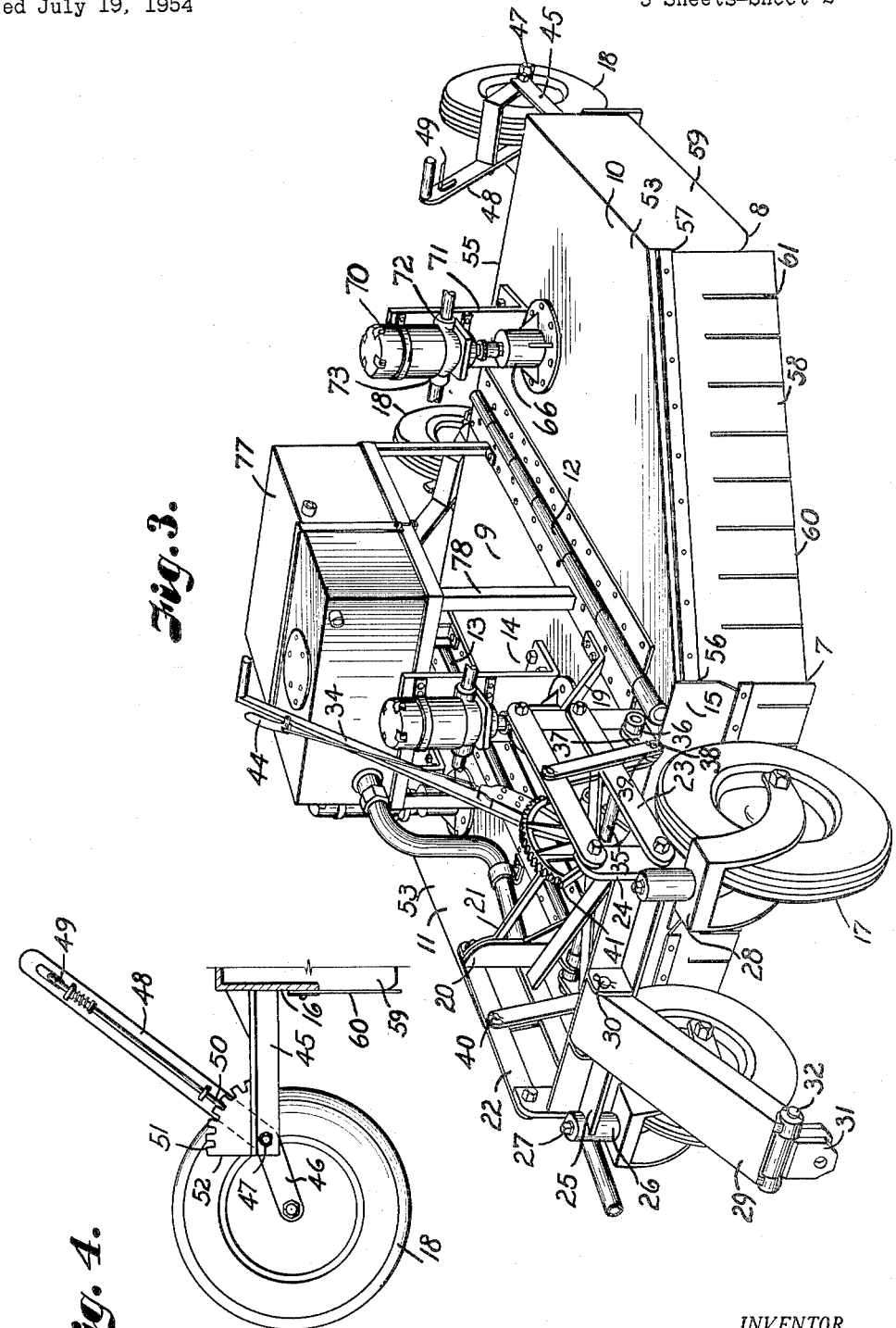

May 1, 1956 F. P. MARTIN 2,743,567
MULTIPLE UNIT CONTOUR MOWER
Filed July 19, 1954 3 Sheets-Sheet 3
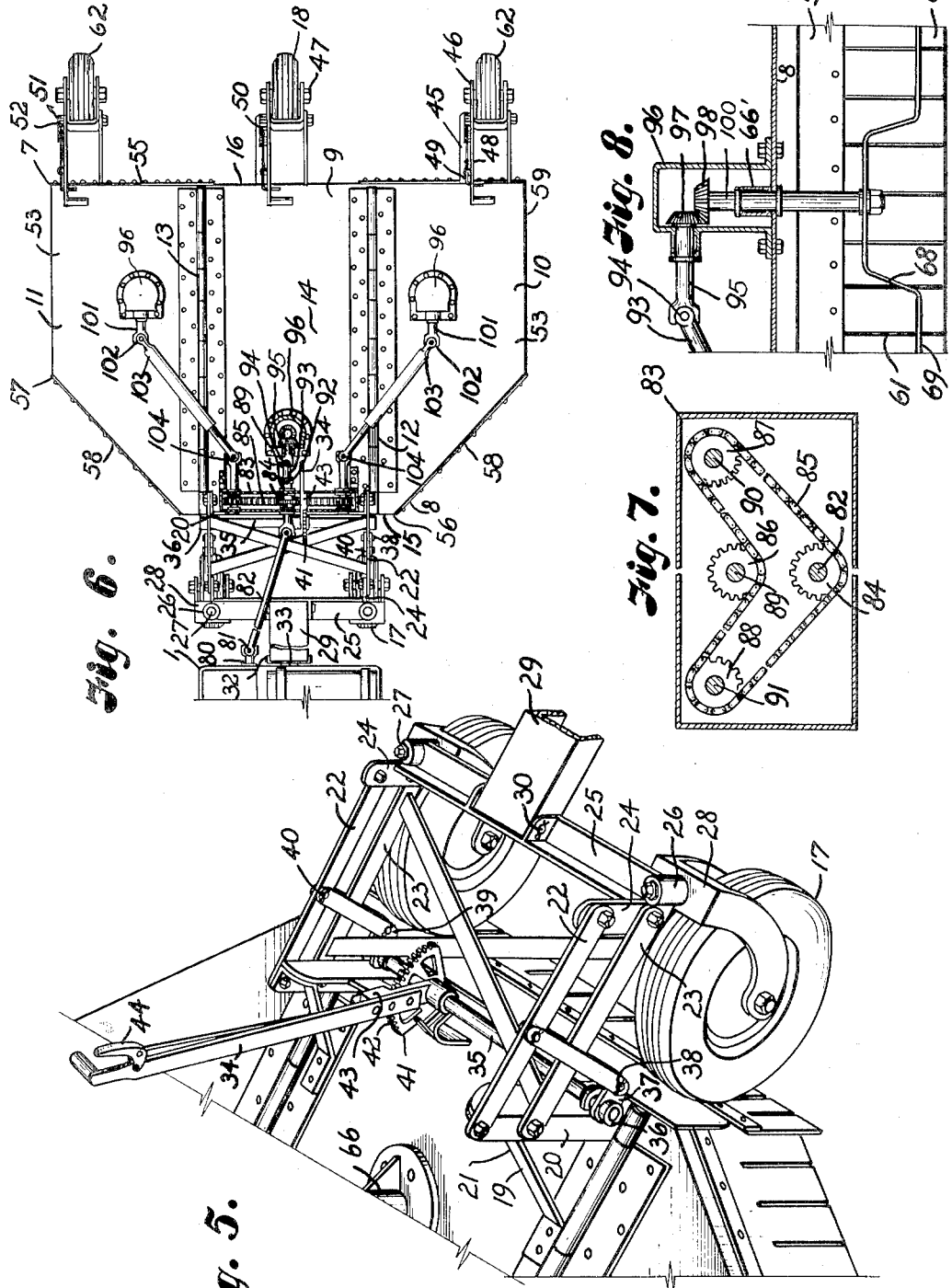
INVENTOR.
Fred P. Martin.
BY
Fishburn & Mullendore
ATTORNEYS.

United States Patent Office 2,743,567
Patented May 1, 1956

2,743,567

MULTIPLE UNIT CONTOUR MOWER

Fred P. Martin, Topeka, Kans.

Application July 19, 1954, Serial No. 444,126

4 Claims. (Cl. 56—6)

This invention relates to mowing machines, and more particularly to a novel mowing machine and combination of a mowing apparatus which will follow the contour of the terrain while cutting grass, weeds and the like to desired heights.

The objects of the present invention are to provide a novel combination of mowing apparatus including a motor driven vehicle having a sickle operatively supported thereon in laterally extending relation thereto and movable and swingable for varying the cutting height and angle of the sickle in accordance with the terrain being cut over at one side of the vehicle, and a rotary mowing apparatus connected to the motor driven vehicle to be towed thereby whereby the rotary mower cuts grass and the like behind the vehicle while the sickle cuts over the terrain at one side of the vehicle; to provide rotary mower apparatus having a frame having a plurality of hingedly connected sections with the hinge axes extending longitudinally of the direction of travel of the mower apparatus and power driven cutter bars rotatably mounted on each frame section for cutting grass and the like thereunder; to provide such a mowing apparatus wherein the frame sections are adjustably supported on ground engaging wheels for varying the height of the cut from the terrain over which it operates; to provide a mowing apparatus having a plurality of hingedly connected sections housing a plurality of cutters rotatable on axes substantially perpendicular to the terrain over which the cutting operations are performed with depending flexible guards at the forward and rearward ends of the housing sections to retard the velocity of any objects tending to be propelled from under the housing sections; to provide such a mowing apparatus wherein power for driving the rotary mowing cutters is derived from the motor driven vehicle and contolled by an operator therein; and to provide a mowing apparatus that is economical to manufacture, easily operated and controlled with a flexibility and use for economically mowing wide swaths, such as highway shoulders, in substantial conformance with the contour thereof.

In accomplishing these and other objects of the present invention, I have provided improved details of structure, the preferred forms of which are illustrated in the accompanying drawings, wherein:

Fig. 1 is a plan view of a motor driven vehicle with a laterally extending vertically adjustable sickle bar thereon and a rotary mowing apparatus pivotally connected to the vehicle and operated therefrom.

Fig. 2 is an enlarged vertical sectional view through the rotary mowing apparatus on the line 2—2, Fig. 1.

Fig. 3 is an enlarged perspective view of the rotary mowing apparatus.

Fig. 4 is an enlarged vertical sectional view through the rear portion of the rotary mowing apparatus on the line 4—4, Fig. 1, particularly illustrating the arrangement of a ground engaging wheel thereon.

Fig. 5 is an enlarged detail perspective view of the adjustable mounting of the front ground engaging wheels of the rotary mower.

Fig. 6 is a plan view of a rotary mower with a modified form of cutter drive thereon.

Fig. 7 is an enlarged sectional view showing the power transmission mechanism for driving the plurality of cutters from the vehicle power takeoff.

Fig. 8 is an enlarged sectional view through the cutter bar drive.

Referring more in detail to the drawings:

1 designates a motor vehicle having a sickle bar 2 supported thereon in laterally extending relation thereto. The sickle bar is movable and swingable relative to the vehicle for varying the cutting height and angle of said sickle bar in accordance with the terrain being cut over at one side of the vehicle. The vehicle 1 and sickle bar 2, together with the supporting and driving mechanism of the sickle bar, constitute a mowing machine constructed and assembled substantially as shown in my Patent No. 2,242,917, issued May 20, 1941, on "Mowing Machine" and is also of the type that is manufactured and sold by the Topeka Highway Mower Company, Topeka, Kansas.

The motor vehicle includes an engine enclosed under a hood 3 which, in addition to driving the wheels 4 supplies power for operating the sickle bar 2, and in addition thereto drives a hydraulic pump 5 for supplying hydraulic fluid, under pressure, to be used as later described. The sickle 2 is swingable on the sickle shoe 6 through an arc of substantialy 180°, that is from a vertical position extending upwardly from the shoe to substantially a vertical position extending downwardly from the shoe, and is also operable at any angle throughout the 180° arc for cutting grass and the like. The shoe 6 is also mounted for swinging movement about a fixed axis so that the cutting height, as well as the angle of the sickle, may be changed in accordance with the terrain being cut over.

The particular details of the construction of the vehicle 1 and sickle bar thereon form no part of the present invention other than in the combination of such a mowing machine with a rotary mower apparatus 7 now to be described.

The rotary mower 7 includes an open bottom frame or housing 8 having a plurality of sections hingedly connected in side by side relation. In the particular structure illustrated there is a center or intermediate section 9 and side sections 10 and 11, the side sections being arranged on opposite sides of the center section and connected thereto by hinges 12 and 13 respectively. The side sections 10 and 11 swing relative to the center section on hinge axes substantially parallel and longitudinally relative to the direction of travel of the mowing apparatus. The hinges 12 and 13 are of substantial length or of suitable structure to support and maintain the relationship of the side and center sections. The center frame or housing section 9 has a top wall 14 with depending front and rear walls 15 and 16 respectively, the sides of said center section being substantially open. The center section 9 is supported by spaced ground engaging front wheels 17 and a rear wheel 18, said wheels being adjustable vertically relative to the center section 9 to vary the height of the top wall 14 from the ground over which the section operates.

In the particular structure illustrated spaced brackets 19 are fixed on the center section 9 adjacent the front thereof, each of said brackets having an upright portion 20 and a downwardly and rearwardly sloping brace member 21, each of which is rigidly connected to the center section. Vertically spaced links 22 and 23 have their rear portions pivotally mounted on each of the upright members 20 and extend substantially forwardly thereof. The forward ends of the links 22 and 23 are pivotally mounted in spaced relation on flanges 24 at the ends of a transverse member 25. The links 22 and 23 are of equal length and the spacings between the pivot axes of the rear portions are substantially equal to the spacings of the pivotal axes of the forward portions whereby swinging of the links upwardly and downwardly provides a parallel motion in the movement of the transverse member 25 upwardly and downwardly relative to the center section 9. The transverse member 25 has spaced bearing members 26 fixed thereto adjacent the flanges 24, said bearing members rotatably mounting pintles 27 of yokes 28 on which the forward wheels 17 are rotatably mounted. This arrangement of the wheels 17, yokes 28 and pintles 27 provide caster mountings.

A tongue member 29 is pivotally connected as at 30 to the transverse member 25 for swinging movement about a horizontal axis, said tongue having a clevis 31 pivotally mounted as at 32 for pivotal mounting about a horizontal axis, said clevis being pivotally connected as at 33 to the rear portion of the vehicle 1 for pivotal movement about a vertical axis. This arrangement of the tongue and its connections with the vehicle and transverse member 25 permits the mowing apparatus 7 to trail behind the vehicle 1 and swing relative thereto in negotiating turns and also permits relative up and down movement whereby both the vehicle 1 and mowing apparatus 7 may substantially follow the contour of the ground over which they operate.

A lever 34 is fixed on a shaft 35 that is rotatably mounted in bearing members 36 carried by the uprights 20, said shaft 35 extending transversely of the mowing apparatus with the axis of rotation substantially parallel to the axes of rotation of the pivotal connections of the links 22 and 23 with the upright members 20. Arms 37 are fixed to the outer ends of the shaft 35 and are each pivotally connected as at 38 to ends of links 39. The other ends of the links 39 are pivotally connected as at 40 to the links 22 intermediate the ends thereof whereby swinging movement of the lever 34 rotates the shaft 35 and through the arms 37 moves the links 39 to swing the links 22 relative to the upright members 20 to raise and lower the forward end of the center 9 relative to the ground engaging wheels 17.

A tooth segment 41 is fixed relative to the center section 9 and has teeth 42 adapted to be engaged by a detent 43 operable by a control member 44 on the lever 34, the detent normally engaging the teeth 42 to hold the lever 34 in selected position to maintain the selected height of the center section 9 relative to the ground, said height being changed by operating the control member 44 to release the detent 43 from the teeth 42 and then swinging the lever 34 to move the forward end of the center section upwardly or downwardly as desired and then the member 44 is released whereby the detent again engages the teeth 42 to maintain said adjusted height of the forward end of the center section 9.

Spaced arms 45 extend rearwardly from the rear wall 16 of the center section and the rear wheel 18 is rotatably mounted on a yoke 46 that is pivotally mounted as at 47 on the arms 45 for swinging movement of the yoke 46 about a horizontal axis. The yoke 46 has an extension forming a lever 48 on which is mounted a control member 49 for operating a detent 50 adapted to normally engage teeth 51 of a segment 52 fixed to one of the arms 45, whereby release of the detent 50 from the segment 52 permits swinging movement of the lever 48 to adjust the height of the rear portion of the center section 9 relative to the ground, and when in selected position the control member 49 is released whereby the detent 50 engages teeth 51 of the segment to retain said rear portion at the desired height. In the illustrated structure the front and rear wheels are individually adjustable relative to the center section 9.

Each of the side sections 10 and 11 has top walls 53 with the side edge 54 adjacent the center section preferably substantially the same length as the top wall of the center section.

The side sections also have depending rear walls 55 and a front edge 56, the front edge 56 extending outwardly a short distance from the hinge connections 12 and 13. The top walls 53 of the side sections 10 and 11 from the end of the front edge 56 are cut to provide a rearwardly and outwardly angled portion 57 having a depending wall 58 thereon. The outer sides of the sections 10 and 11 also have depending walls 59. The side sections 10 and 11 are preferably offset relative to the center section 9 whereby the front edge 56 is spaced slightly rearwardly of the front wall 15 of the center section and the rear wall 55 is spaced slightly rearwardly of the rear wall 16 whereby the respective front and rear walls may over lap and not interfere with the swinging action of the sections.

The front walls 15 and 16, angularly arranged wall 58 and rear walls 55 are all preferably shorter in height than the side walls 59, the walls on the center and side sections cooperating to form a combined peripheral wall that encloses cutters later described. Flexible guard members 60 are suitably mounted on said shorter walls and depend therefrom whereby the lower edges of the flexible guard walls are substantially on the same level with the lower edges of the side walls 59. The flexible guard members 60 are preferably of relatively heavy belting or the like and have vertical slots 61 therein to provide a plurality of fingers, the flexibility of which permits rocks or other heavy objects to pass from under the housing sections and yet the heavy flexible material is such that it will substantially reduce the velocity of objects and thereby reduce the possibility of injury to persons nearby.

Ground engaging wheels 62 are arranged rearwardly of and adjacent the outer side of each of the side sections 10 and 11, the wheels 62 being adjustably mounted relative to the side sections with lever structures and arms substantially the same as the mounting of the ground engaging wheel 18 at the rear of the center section. The ground engaging wheels 62 together with the mounting structure thereof cooperate with the hinges 12 and 13 to support the side sections 10 and 11 respectively and all wheels preferably should be adjusted relative to the respective sections whereby the height of the cut above the ground is uniform.

Bearing housings 66 are suitably supported on each of the frame or housing sections and rotatably mount shafts 67 for rotation on axes substantially perpendicular to the top walls 14 and 53 of the frame or housing sections. The shafts 67 extend downwardly from the bearing housing sections. The shafts 67 extend downwardly from the bearing housing 66 and cutter bars 68 are suitably mounted adjacent the lower ends of the respective shafts whereby said cutter bars are rotated in response to rotation of the shafts 67. The blades 69 of the cutter bars 68 are preferably positioned slightly above the lower edges of the side walls and guards of the housing sections. It is preferable that the bearing housing 66 in the center housing section be in the forward portion thereof intermediate the width and spaced from the forward wall 15 sufficiently to provide clearance for swinging of the cutter bar 68. The bearing members 66 in the housing sections 10 and 11 are in the rearward portion thereof and spaced from the side walls 59 and rear walls 55 sufficiently to provide clearance for swinging of the cutter blades 68 thereon. Also the bearing members 66 in the side housing sections 10 and 11 are spaced laterally and rearwardly from the bearing member 66 in the center housing section sufficiently to provide clearance between the ends of the cutter bars, but the lateral spacing of the axes of the cutter bars and the radius of cut thereof are such that the swaths cut by the cutter bars on the side sections overlap the swath cut by the cutter bar on the center section whereby substantially all of the terrain for a width almost as wide as the total width of the mowing apparatus 7 is cut.

In the form of the invention illustrated in Figs. 1 to 5 inclusive, each of the cutter bars 68 is individually driven by a suitable motor 70, having operative connection (not shown) with the respective shaft 67. The motors 70 are preferably fluid operated motors which are supported on brackets 71 suitably mounted on the respective housing sections. Each of the motors has a fluid inlet connection 72 and a fluid outlet connection 73. These connections are connected to conduits 74 and 75 respectively which lead to a valve 76, which controls application of fluid pressure through the conduits to the motors 70. The valve 76 is preferably on the vehicle 1 adjacent the operator's seat and is suitably connected whereby fluid from the pump 5 is controlled by the valve for selective operation of the motors 70 for driving the cutter bars 68 and the return flow of the fluid from the motors 70 whereby the return flow goes to a suitable reservoir from which the pump 5 obtains its fluid supply. In order that there may be a large fluid supply a tank 77 is preferably suitably supported on a framework 78 adjacent the rear portion of the center housing section. With this arrangement of the valve 76 and conduits 74 and 75 the motors 70 are reversible whereby if material should clog or otherwise interfere with rotation of the cutter bars, operation of the valve 76 would reverse the direction of rotation of the motors and aid in clearing the cutter bars. It is believed obvious that the fluid outlet connections 73 of the motors may be connected to the supply tank 77 if desired and with such an arrangement, operation of the valve 76 would stop the motors or cause operation of same in one direction only.

In operating a mowing apparatus constructed as described the clevis 31 at the forward end of the tongue 29 is connected to a suitable hitch at the rear of the vehicle 1. The engine in the vehicle 1 is then started providing power for driving the wheels 4 of the vehicle whereby the vehicle and the mowing apparatus 7 are moved to the side of an area to be mowed, for example the terrain at the side of a highway. The vehicle 1 and mowing apparatus 7 are maneuvered until the side wall 59 on the side section 10 is adjacent to or over the edge of the pavement whereby the cutter bar on the side section 10 cuts grass and the like along the edge of the pavement as the mowing apparatus is moved along the right-hand side of the road. The levers 34 and 48 are manipulated to adjust the housings of the mowing apparatus 7 relative to the ground and position the cutter bars at a desired distance from the ground. It is to be noted that the hinge connections 12 and 13 are arranged whereby the respective sections may move up and down to follow the contour of the ground and also, due to the pivotal connections follow the contour of the ground longitudinally of the direction of travel of the apparatus. The sickle bar 2 and shoe 6 are adjusted to desired angularity and height to cut grass and the like at the side of the vehicle 1. It is to be noted that the sickle 2 cuts a swath that overlaps slightly with the swath cut by the cutter bar on the housing section 11 and the sickle 2 extends substantially beyond the side of the mowing apparatus 7 and cooperates therewith to provide a very wide total swath of cut. The valve 76 is then operated whereby the pump 5 delivers hydraulic pressure through the ducts 74 to the motors 70, the return flow of liquid from the motors 70 flowing through the conduits 75 to the valve 76 and then to the reservoir 77. The flow of fluid through the motors 70 drives the cutter bars 68 to cut grass, weeds and the like. Then the vehicle 1 is driven forward and tows the mowing apparatus 7 and the sickle 2 operated to make the desired cut, and when obstructions, such as mailbox posts and the like, are approached the operator manipulates the controls to raise the sickle 2 and moves around the obstacle, then lowering the sickle 2 to proceed with the cut. Also the sickle 2 may be raised and lowered whereby its angle is varied according to the contour of the ground being mowed. The levers 34 and 48 may be manipulated as desired to change the height of the cut.

In the form of the invention illustrated in Figs 6 and 8, the frame or housing sections and wheels supporting same are substantially the same as illustrated in Figs. 1 to 5 inclusive, the structure differing in that there is a modified form of drive for the cutter bars. In this form of the invention the vehicle 1 has a power takeoff shaft 80 extending rearwardly therefrom and connected by a universal joint 81 with a shaft 82 rotatably mounted in a transmission housing 83. The shaft 82 is provided with a sprocket 84 which is operatively connected by a chain 85 with sprockets 86, 87 and 88, fixed on shafts 89, 90 and 91 respectively which are rotatably mounted in the housing 83 and extend rearwardly therefrom. The shaft 89 is connected by a universal joint 92 to a shaft 93, the rear end of which is connected by a universal joint 94 to a drive shaft 95 that is rotatably mounted in a gear housing 96, said shaft 95 having a gear 97 fixed thereon and meshing with a gear 98 fixed on the shaft 100 that is rotatably supported in a bearing housing 66' carried by the center frame or housing 9. A cutter bar 68 which is the same as illustrated and described in connection with Fig. 2 is carried on the lower end of the shaft 100. The side frames or housings 10 and 11 have cutter bars 68, shafts 100 and gear housings 96 supported thereon which are of similar construction to that carried by the center section 9, the position of the cutter bars and shafts carrying same preferably being substantially the same as illustrated and described in connection with the structure illustrated in Figs. 1 to 5 inclusive.

Drive shafts 101 extend from the gear housings on the side housings or frames 10 and 11 and are connected by universal joints 102 to the rear portions of telescoping drive shafts 103, the forward portions being connected by universal joints 104 to the shafts 90 and 91 respectively. It is preferable that the axes of the shafts 90 and 91 be substantially over the forward ends of the axes of the hinges 12 and 13 whereby even extreme angularities between the sections of the rotary mower apparatus will not interfere with the telescoping shafts driving the cutter bars. In this form of the invention, operation of the vehicle 1 and power takeoff thereof provide the power for driving the cutter bars on the mower sections. Otherwise the operation of the mowing apparatus is substantially the same as described in connection with the structure illustrated in Figs. 1 to 5 inclusive.

It is believed obvious I have provided a mowing apparatus which is economical to manufacture, efficient in operation and of such structure as to follow the contour of the terrain over which it operates and cut a wide swath thereover at one operation under the control of a single operator.

What I claim and desire to secure by Letters Patent is:

1. A rotary mower apparatus including, a plurality of open bottom housings arranged in side by side relation, hinged means connecting adjacent sides of the housings for relative hinging movement about an axis substantially longitudinally of the direction of travel of the mower apparatus, said hinged means extending substantially adjacent the forward and rearward ends of said housings, ground-engaging wheels arranged at the forward end of one of the housings, at least one ground-engaging wheel arranged at the rearward end of each of said one and the other of the housings with the wheel at the rearward end of the other of said housings adjacent the side thereof remote from the hinge means, means adjustably supporting the housings on the ground-engaging wheels and operable for varying the heighth of said housings from the terrain over which the mower apparatus operates, said ground-engaging wheel at the rearward end of said other housing cooperating with the hinge means in supporting said other housing for following the contour of the terrain, a rotary cutter unit supported by each of the housings and each having a cutting element mounted for rotation about a vertical axis and operable to cut grass and the like, and power means operably connected to the rotary cutter units for driving same to effect cutting of grass and the like by the cutting elements, said rotary cutter units having a spacing relative to the radius of cut of the respective cutting elements and the hinged means connecting the housings whereby there is an overlap of the swath cut by adjacent cutting elements.

2. A rotary mower apparatus including a plurality of open bottom housings arranged in side by side relation, each of said housings having adjacent side edges thereof parallel and extending substantially longitudinally of the direction of travel of the mower apparatus, hinged means connecting adjacent side edges of the housings and extending substantially the length thereof for relative hinging movement about an axis substantially longitudinally of the direction of travel of the mower apparatus, a plurality of ground-engaging wheels arranged at the forward end of one of the housings, at least one ground-engaging wheel arranged at the rearward end of said one and the other of the housings with the wheel at the rearward end of the other of said housings adjacent the side thereof remote from the hinge means, means mounting the wheels at the rearward ends of each of the housings whereby the axes of the wheels is maintained substantially transversely of the direction of travel of the mower apparatus, means adjustably supporting the housings on the ground-engaging wheels and operable for varying the heighth of said housings from the terrain over which the mower apparatus operates, said ground-engaging wheel at the rearward end of said other housing cooperating with the hinge means in supporting said other housing whereby said housings can swing to substantially follow the contour of the terrain, a rotary cutter unit supported by each of the housings and each having a cutting element mounted for rotation about a vertical axis and operable to cut grass and the like, depending flexible guard walls adjacent the forward and rearward ends of the housings and extending to the lowermost portions of the cutter elements, and power means operably connected to the rotary cutter units for driving same to effect cutting of grass and the like by the cutting elements, said rotary cutter units on adjacent housings being spaced longitudinally of the direction of travel of the mower apparatus and having lateral spacing relative to the radius of cut of the respective cutting elements and the hinged means connecting the housings whereby there is an overlap of the swath cut by adjacent cutting elements.

3. A rotary mower apparatus including, a plurality of open bottom housings arranged in side by side relation, each of said housings having adjacent side edges thereof parallel and extending substantially longitudinally of the direction of travel of the mower apparatus, hinged means connecting adjacent side edges of the housings for relative hinging movement about an axis substantially longitudinally of the direction of travel of the mower apparatus, said hinged means being of substantial length and adjacent the forward and rearward ends of said housings, a plurality of ground-engaging wheels arranged at the forward end of one of the housings, at least one ground-engaging wheel arranged at the rearward end of each of the housings, with the wheel at the rearward end of the other of said housings adjacent the side thereof remote from the hinge means, means mounting the ground-engaging wheels at the forward end of said one housing for castered turning of said wheels, means mounting the wheels at the rearward ends of each of the housings whereby the axes of the wheels is maintained substantially transversely of the direction of travel of the mower apparatus, means adjustably supporting the housings on the ground-engaging wheels and operable for varying the heighth of said housings from the terrain over which the mower apparatus operates, said ground-engaging wheel at the rearward end of said other housing cooperating with the hinge means in supporting said other housing whereby said housings can swing to substantially follow the contour of the terrain, a rotary cutter unit supported by each of the housings and each having a cutting element mounted for rotation about a vertical axis and operable to cut grass and the like, said cutting elements each operating in a plane substantially fixed in elevation relative to the respective housings, said housings having depending walls, cooperating to form a combined peripheral wall at the outer edges of the housings, depending flexible guard walls adjacent the forward and rearward ends of the housings and extending to the lowermost portions of the cutter elements, and power means operably connected to the rotary cutter units for driving same to effect cutting of grass and the like by the cutting elements, said rotary cutter units on adjacent housings being spaced longitudinally of the direction of travel of the mower apparatus and having a lateral spacing relative to the radius of cut of the respective cutting elements and the hinged means connecting the housings whereby there is an overlap of the swath cut by adjacent cutting elements.

4. A rotary mower apparatus including, a plurality of frame sections arranged in side by side relation, top walls on each of the frame sections, front and rear walls extending downwardly from an intermediate frame section, a plurality of ground-engaging wheels arranged at the forward and rearward ends of the intermediate frame section, means mounting the ground-engaging wheels at the forward end of the intermediate frame section for caster turning of said wheels, means mounting at least one wheel at the rearward end of intermediate frame section whereby the axis of the wheel is maintained substantially transversely of the direction of travel of the mower apparatus, means adjustably supporting the intermediate frame section on the ground-engaging wheels and operable for varying the heighth of said intermediate frame section from the terrain over which the mower apparatus operates, said frame sections having adjacent side edges thereof parallel and extending substantially longitudinally of the direction of travel of the mower apparatus, elongated hinged means connecting adjacent side edges of the frame sections for relative hinging movement about an axis substantially longitudinally of the direction of travel of the mower apparatus, said hinged means being of substantial length and adjacent the forward and rearward ends of said frame sections, a ground-engaging wheel arranged at the rearward end of each of the side frame sections at the sides of the intermediate frame section and adjacent the side remote from the hinge means, means mounting the wheels at the rearward ends of the frame sections at the sides of the intermediate section whereby the axes of the wheels is maintained substantially transversely of the direction of travel of the mower apparatus, means adjustably supporting said side frame sections on the respective ground-engaging wheels and operable for varying the height of said side frame sections from the terrain over which the mower apparatus operates, said ground-engaging wheels at the rearward ends of said side frame sections cooperating with the hinge means in supporting said side frame sections whereby said side frame sections can swing to substantially follow the contour of the terrain, a rotary cutter unit supported by each of the frame sections and each having a cutting element mounted for rotation about an axis substantially perpendicular to the terrain and operable to cut grass and the like, said cutting elements each operating in a plane substantially fixed in elevation relative to the respective frame sections, depending walls on each of the side frame sections at the front, rear and side edge spaced from the hinge means cooperating with the walls on the intermediate frame section to form a combined peripheral wall at the outer edges of the frame sections, depending flexible guard walls adjacent the forward and rearward ends of the frame sections and extending to the lowermost portions of the cutter elements, and power means operably connected to the rotary cutter units for driving same to effect cutting of grass and the like by the cutting elements, said rotary cutter units supported by the side frame sections being spaced from the cutter unit supported on the intermediate frame section laterally and longitudinally of the direction of travel of the mower apparatus and relative to the radius of cut of the respective cutting elements and the hinged means connecting the frame sections whereby there is an overlap of the swath cut by the adjacent cutting elements.

References Cited in the file of this patent

UNITED STATES PATENTS

| | | |
|---|---|---|
| 1,164,305 | Nilson et al. | Dec. 14, 1915 |
| 2,242,917 | Martin | May 20, 1941 |
| 2,489,204 | Sprick et al. | Nov. 22, 1949 |
| 2,539,934 | Smith et al. | Jan. 30, 1951 |
| 2,609,650 | Lindquist | Sept. 9, 1952 |
| 2,682,740 | Miller et al. | July 6, 1954 |